United States Patent

[11] 3,571,933

| [72] | Inventor | Thomas H. Johnson<br>Box 811, Auburn, Calif. 95603 |
|---|---|---|
| [21] | Appl. No. | 769,809 |
| [22] | Filed | Oct. 23, 1968 |
| [45] | Patented | Mar. 23, 1971 |

[54] DISTANCE INDICATOR FOR GOLF CART
1 Claim, 6 Drawing Figs.

[52] U.S. Cl. .................................................... 33/142, 235/95
[51] Int. Cl. ..................................................... G01b 3/12, G01c 22/00
[50] Field of Search .......................................... 33/141 (C), 125 (R), 142; 235/132, 65, 67, 95, 96

[56] References Cited
UNITED STATES PATENTS

| 208,101 | 9/1878 | Kethledge | 33/142 |
| 997,648 | 7/1911 | Cavanagh et al. | 33/141(C) |
| 2,452,241 | 10/1948 | Jantzen | 33/141(C) |
| 3,202,353 | 8/1965 | Nowak et al. | 235/95 |
| 3,441,209 | 4/1969 | Farman | 235/95 |

FOREIGN PATENTS

| 907,924 | 7/1945 | France | 3/141(C) |
| 2,130 | 1879 | Great Britain | 33/141(C) |
| 17,840 | 1888 | Great Britain | 33/141(C) |

Primary Examiner—Robert B. Hull
Attorney—Lothrop and West

ABSTRACT: Mounted on a golf cart and engageable with a wheel of the cart is a meter calibrated to indicate on a yardage scale the distance traveled by the cart on any particular hole. An inverse scale simultaneously indicates the remaining distance from the cart to the hole. Indicating pointers traveling along the two scales can be individually reset at the beginning of each hole or at the conclusion of each stroke. A cumulative yardage indicator is also optionally utilized.

PATENTED MAR23 1971
3,571,933
SHEET 1 OF 2
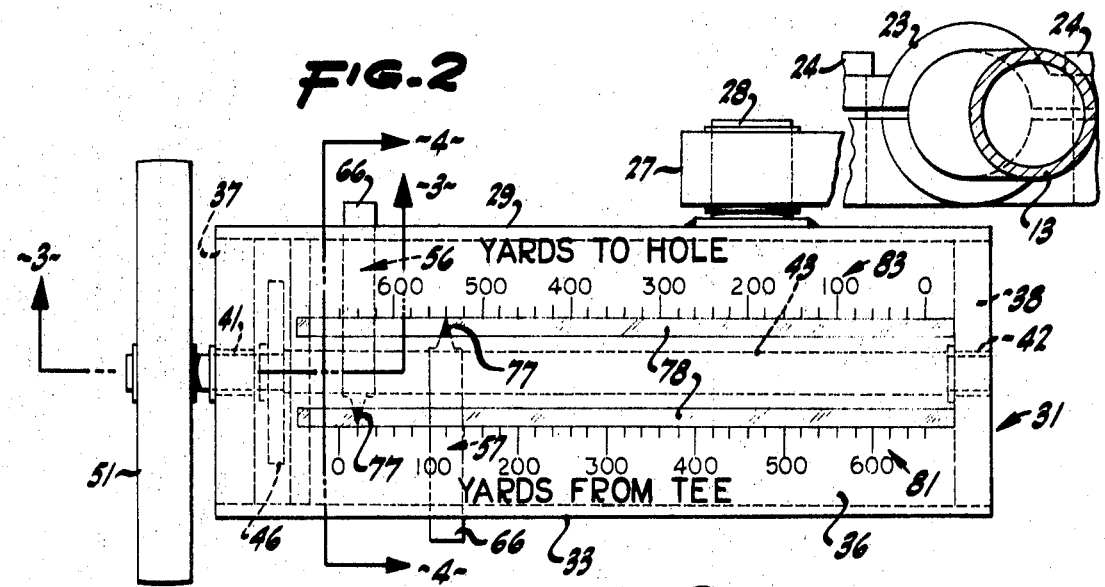
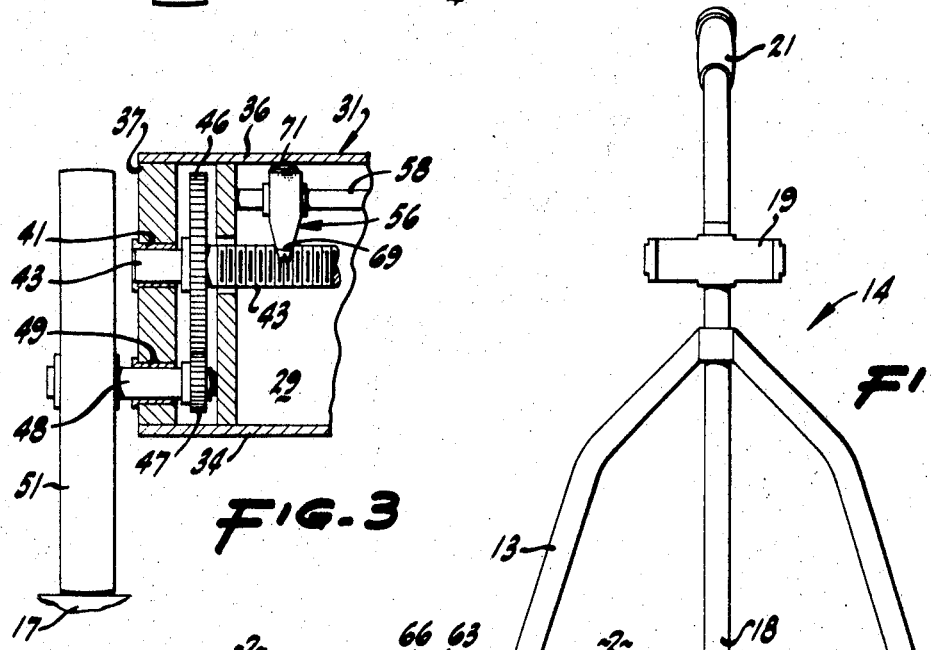
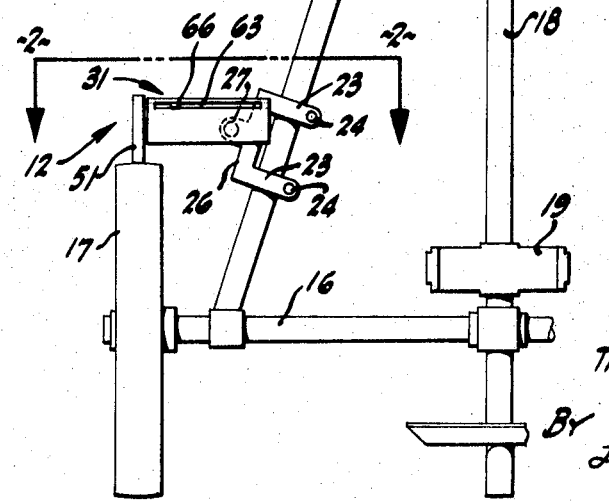
INVENTOR.
THOMAS H. JOHNSON
BY Lothrop & West
ATTORNEYS

PATENTED MAR 23 1971

INVENTOR.
THOMAS H. JOHNSON
BY
Lothrop & West
ATTORNEYS

DISTANCE INDICATOR FOR GOLF CART

The invention relates to improvements in distance indicators for golf carts.

It is an object of the invention to provide a distance indicator which can readily be attached to a golf cart either at the factory or at a subsequent time.

It is another object of the invention to provide an indicator which clearly shows the yardage traveled by the cart and the approximate yardage from the ball to the cup on any hole.

It is a further object of the invention to provide a distance indicator for golf cart which has but few moving parts to get out of order and which is not only economical and reliable but long-lived as well.

It is another object of the invention to provide a generally improved yardage indicating device for a golf cart.

Other objects, together with the foregoing, are attained in the embodiments described in the following description and illustrated in the accompanying drawing in which:

FIG. 1 is a fragmentary front elevational view of a typical golf cart showing one form of distance indicator installed on the cart;

FIG. 2 is a fragmentary top plan view of the installed device, partially in section, and to an enlarged scale, the plane of the section being indicated by the line 2–2 in FIG. 1;

FIG. 3 is a fragmentary sectional view of the drive mechanism, to an enlarged scale, the plane of the section being indicated by the line 3–3 in FIG. 2;

Figure 4:
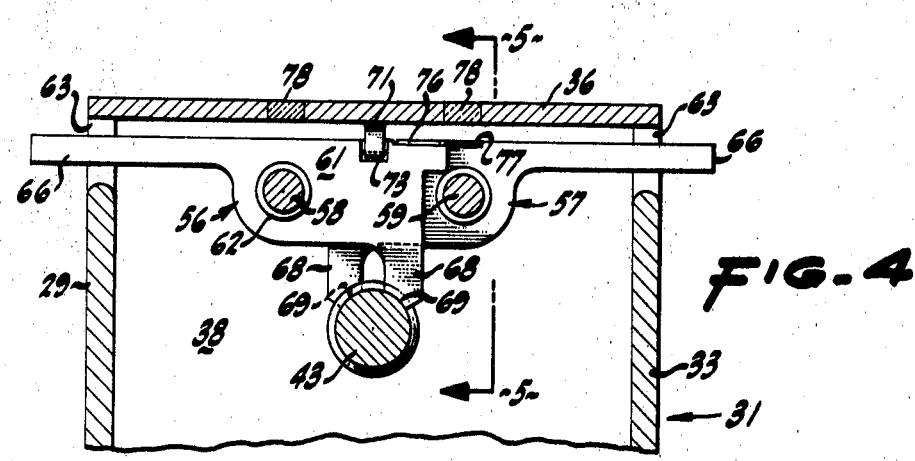
FIG. 4 is a fragmentary, transverse sectional view, to an enlarged scale, the plane of the section being indicated by the line 4–4 in FIG. 2.

While the distance indicator of the invention is susceptible of numerous physical embodiments, depending upon the environment and requirements of use, substantial numbers of the herein shown and described embodiments have been made, tested and used, and all have performed in an eminently satisfactory manner.

The form of indicator of the invention illustrated in FIGS. 1 through 5 is generally designated by the reference numeral 12 and is readily installed on one strut 13 of a typical golf cart 14 provided with the usual axle 16, rubber-tired wheels 17 and main column 18 carrying a pair of golf-bag embracing arms 19 and push-handle grip 21.

The indicator 12 is attached to the strut 13 by any suitable structure such as a spaced pair of clamping brackets 23 clamped on their nether ends by conventional threaded fasteners 24. The brackets 23 are joined by a cross member 26 carrying a hub 27 pivotally mounted on a pin 28 (see FIG. 2) projection from the vertical rear wall 29 of an elongated housing 31. If desired, a setscrew (not shown) extending radially through the hub 27 and into engagement with the pin 28 can be used to immobilize the housing 31 in any selected attitude.

The housing 31 includes in addition to the vertical rear wall 29 a vertical front wall 33, a bottom 34 and a top closure 36. The two opposite ends 37 and 38 of the housing serve not only as sealing closures but also carry journal bearings 41 and 42 within which are rotatably mounted the ends of a screw-threaded shaft 43.

Rotation of the shaft 43 is effected by a large gear 46 mounted coaxially on the shaft 43 adjacent the bearing 41. A small gear 47 on a stub shaft 48 carried in a journal 49 engages the large gear 46 and is driven by a friction wheel 51, or disc, in frictional engagement along a tangential plane with the cart wheel 17.

It can therefore by seen that as the cart 14 moves ahead, the cart wheel 17 drives the friction wheel 51 which, in turn, rotates the threaded shaft 43 via the small gear 47 and the large gear 46.

Rotational movement of the shaft 43 is converted to translational movement of a pair of carrier members 56 and 57, slidably mounted on slider bars 58 and 59, respectively.

Each of the carriers is substantially identical to the other except that they each face in opposite directions. A description of one will therefore serve to describe the other.

Each carrier is roughly L-shaped in side elevation (see FIG. 4) and included a main body portion 61 having a through bushing 62 journaled on the slider bar 58 (or 59). Extending horizontally from the body 61 and projection through a slot 63 in the housing sidewalls is a handle portion 66.

Figure 5:
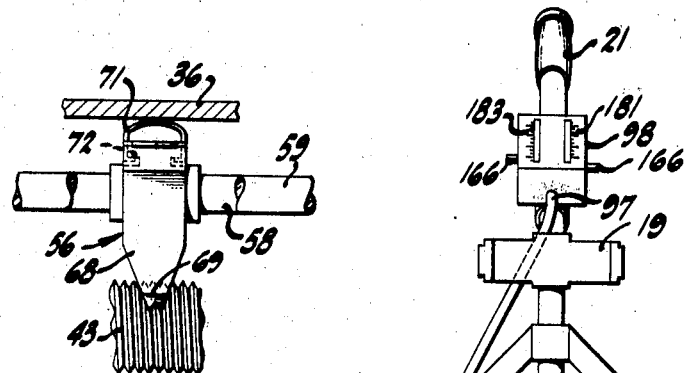
FIG. 5 is a fragmentary sectional view to an enlarged scale, of the slidable pointed carrier mechanism, the plane of the section being indicated by the line 5–5 in FIG. 4.

Projecting downwardly from the body 61 is a thread-engaging finger 68 tapered to form a bifurcated tip 69 straddling a small segment of screw thread (see FIGS. 4 and 5).

Serving yieldingly to bias the finger tip 69 downwardly into engagement with the screw thread is a bowed visible spring 71 anchored by a pair of inwardly bent lower arms 72 inserted within corresponding recesses 73 in the sidewalls of the upper portion of the carrier body 61. The top surface of the leaf spring 71 bears against the lower surface of the housing cover 36, and although the leaf spring readily slides along the lower surface of the cover 36 the spring tends to retain the finger tip in firm engagement with the screw despite vibration and jarring as the cart travels along its path.

The spring 71 is yieldable, however, to supervening force exerted downwardly on the exteriorly projecting carrier handle 66, the effect of this force being to move the finger 68 upwardly about the shaft 58 as a pivot, and disengage the finger tip 69 from the threads. As soon as the finger tip 69 clears the threads the carrier can, by exerting lateral force on the handle 66, be moved in either direction along the slider bar 58. Upon reaching the desired location, the handle 66 is released and the spring 71 again biases the finger tip 69 into engagement with the screw.

A pointer 76 is mounted horizontally on the carrier, the pointer terminating in a triangular-shaped tip 77 visable from above through an elongated transparent window 78 inserted in the top cover 36 of the housing.

As appears most clearly in FIG. 2, direct reading yardage indicia 81 are provided on the top cover at the edge of the bottom one of the windows 78, whereas inversely reading yardage indicia 83 are marked along the edge of the upper window.

In operation, the distance meter is reset at the beginning of each hole. For example, let it be assumed that the next hole is 560 yards, this yardage being ascertained by reference to the score card, or to a yardage marker located at the tee.

The first step (see FIG. 2) is to depress the upper one of the handles 66 and slide the carrier to the left until the corresponding (lower) pointed tip is opposite the numeral 0 on the lower scale, at which time the handle is released. Next the lower one of the projecting handles 66 is pressed downwardly and the carrier slid to the left until the corresponding (upper) pointer 77 is opposite the 560 yard mark on the upper scale, the handle then being released to allow engagement between the finger tips 69 and the threads.

After the golf ball is driven, the player walks off the tee, headed toward the ball, propelling the golf cart along the path. FIG. 2 illustrated the location of the pointers after the player has walked 20 yards. That is to say, the left-hand pointer is opposite the scribe mark indicating 20 yards on the scale called YARDS FROM TEE. The other, right hand pointer has concurrently moved toward the right and now appears at the 540 yard mark on the scale called YARDS TO HOLE.

The scaler markings are arranged and calibrated as a function of the diameter of the cart wheel 51 and the dimensions of the components of the transmission train. Extra yardage is provided on the scale in the expectation that most golfers will undertake a certain number of excursions from a linear path from tee to cup.

By referring to the direct scale, the golfer can quickly read the cumulative yardage traversed since leaving the tee. Even more importantly, the upper, inverted reading scale, tells the player how many yards remain, thereby assisting in selecting the proper club to be used. Some golfers prefer to reset the YARDS FROM TEE pointer before each stroke so as to measure the distance the ball is hit.

Figure 6:
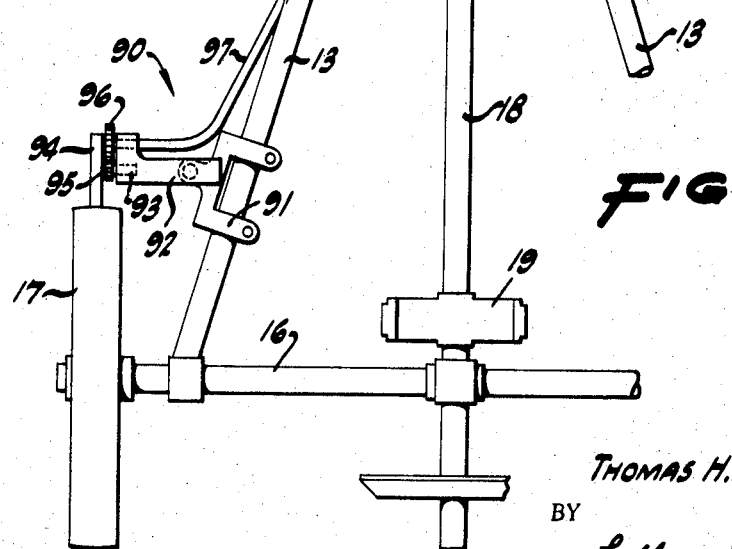
FIG. 6 is a front elevational view of a golf cart as in FIG. 1 but illustration g variant form of distance indicator installed thereon.

FIG. 6 illustrates a variant form of device designated 90 wherein a mounting bracket 91 supports a frame 92 having journaled therein a shaft 93 carrying a friction wheel 94 (engaging the cart wheel 17) and a small gear 95. In engagement with the small gear 95 is a large gear 96 connected to a flexible cable 97 leading upwardly and entering a housing 98 mounted on the cart handle, quite close to the user's eyes for ease of reading. In this position, the housing is also readily accessible so as to facilitate the manipulation, at the conclusion of each hole, of the handles 166 so sa to reset the pointers opposite the yardage scales 181 and 183.

The flexible cable 97 is attached to a shaft journaled in the housing 98, the shaft being comparable in structure and operation to the threaded shaft 43, which is shown most clearly in FIG. 3. The remainder of the transmission and other elements within the box 98 are substantially indentical with those heretofore described in connection with the first form of device. For ease of reading, however, the numerals on the indicia 181 and 183 are preferably rotated 90° so as to face toward the player holding the handle the player holding the handle grip 21.

Many golfers are interested in knowing how far they walked during the round, and for these persons I incorporate a third scale or yardage indicia on the face of the housing 31, the scale reading from 0 to about 6600 yards. A cumulative yardage pointer is driven, as before by the friction wheel 51, a 10 to 1 reduction gear train of conventional make being interposed so as to cause the pointer to move at a rate appropriate to the cumulative yardage scale. The pointer, as before, can be reset to zero at the end of each round.

It can therefore be seen that I have provided a compact, reliable yardage indicator for installation on a golf cart either at the factory or as purchased in kit form and installed at a later time.

I claim:

1. A distance indicator for a golf cart comprising:
   a. a housing attached to the cart, said housing including an exposed face;
   b. a first linear yardage scale on said face starting from zero at one end of said face;
   c. a second, inverse liner yardage scale on said face, said second scale being parallel to said first scale and starting from zero at the opposite end of said face;
   d. a first carrier slidably mounted on said housing, said first carrier including a first pointer movable relative to said first scale;
   e. a second carrier slidably mounted on said housing, said second carrier including a second pointer movable relative to said second scale; and
   f. cart wheel driven means selectively engageable with said first carrier and said second carrier and calibrated to position said first pointer and said second pointer relative to said first linear yardage scale and said second, inverse linear yardage scale, respectively, in dependence upon the distance traveled by the cart.